United States Patent [19]

Ruhlman

[11] 4,338,828
[45] Jul. 13, 1982

[54] TRANSMISSION SHIFT CONTROL GUIDE AND DETENT APPARATUS

[75] Inventor: Harold W. Ruhlman, Muncie, Ind.

[73] Assignee: Borg-Warner Corporation, Chicago, Ill.

[21] Appl. No.: 152,067

[22] Filed: May 21, 1980

[51] Int. Cl.³ .............................................. G05G 5/06
[52] U.S. Cl. ........................................ 74/475; 74/527
[58] Field of Search ...................... 74/473 R, 475, 527

[56] References Cited

U.S. PATENT DOCUMENTS

| | | | |
|---|---|---|---|
| 1,349,973 | 8/1920 | Mather | 74/475 X |
| 1,900,119 | 3/1933 | Lysholm et al. | 74/473 R X |
| 2,964,964 | 12/1960 | Craig | 74/473 R |
| 3,426,611 | 2/1969 | Hauser | 74/475 |
| 3,513,717 | 5/1970 | Lickey et al. | 74/475 X |

FOREIGN PATENT DOCUMENTS

| | | | |
|---|---|---|---|
| 734540 | 4/1943 | Fed. Rep. of Germany | 74/473 R |
| 417462 | 11/1910 | France | 74/475 |
| 1179202 | 1/1970 | United Kingdom | 74/473 R |

*Primary Examiner*—Allan D. Herrmann
*Attorney, Agent, or Firm*—Julian Schachner

[57] ABSTRACT

Transmission shift control guide and detent apparatus includes a mechanism for defining the shift path for any given gear change, and for providing detenting both for ratio selection and for engagement of the selected gear set. A guide plate defines a predetermined track. A pin associated with the transmission shift lever is movable along this track to establish a precise definition of the path for each selecting and engaging movement. The plate also defines a plurality of depressions which form a detent map. A spring-loaded ball is moved over this map by the action of the transmission shift lever. This develops predetermined resistive forces against which the shift lever must be moved during the selecting and engaging movements. Stresses are absorbed in the guide plate rather than in the shift rail.

4 Claims, 8 Drawing Figures

TRANSMISSION SHIFT CONTROL GUIDE AND DETENT APPARATUS

BACKGROUND OF THE INVENTION

This invention relates generally to automotive transmissions or the like. More particularly, it relates to a sliding gear manual transmission incorporating shift control guide and detent apparatus for precisely defining the gear shifting path and for developing detent forces when shifting in both the lateral and longitudinal planes.

In recent years there have been many improvements in the control of automotive transmissions, including improvements relating to the shifting of sliding gear manual transmissions. Some transmissions included a plurality of shift rails, one of which was selected and moved for corresponding selection and engagement of a desired speed ratio. Other transmissions included a single shift rail which was rotated for speed ratio selection and moved longitudinally for engagement of the selected ratio. Transmissions such as these usually provided some lockout mechanism for preventing engagement of ratios other than the one selected. This interlock mechanism was subject to binding.

Further, some transmissions included guide devices for guiding longitudinal rail movement. Other transmissions included detent devices for indicating longitudinal rail position. Such detents usually offered some resistance to longitudinal rail movement, thereby providing the vehicle operator with a sense of feel related to gear-engaging rail movement. These guide and detent devices generally required complex machined parts which were expensive to fabricate.

Thus, there remains a need in the art to provide simple and inexpensive means for precisely defining both the lateral selecting and longitudinal engaging movements of the shifting assembly within a manual transmission, for preventing interlock binding, and for detenting during both the selecting and engaging movements to provide desired operator feel.

SUMMARY OF THE INVENTION

The primary object of this invention is to meet the needs noted above. To that end there is provided shift control apparatus which may be incorporated in a sliding gear manual transmission having, for example, five synchronized forward speed ratios and a reverse speed ratio. The apparatus includes a simple, inexpensive mechanism for providing precise definition of the path for any given gear change, and for providing detenting in both the lateral plane for ratio selection and the longitudinal plane for engagement of the selected gear set.

A guide plate defines a groove which establishes a predetermined track. A pin associated with the transmission shift lever is movable along this track to establish a precise definition of the path for each selecting and engaging movement.

The plate also defines a plurality of depressions which form a detent map. A spring-loaded ball is moved over this map by the action of the transmission shift lever. This movement develops predetermined resistive forces against which the shift lever must be moved during the selecting and engaging operations. As a result, operator feel can be individually predetermined for each selecting and engaging movement. Stresses are absorbed in the guide plate rather than in the shift rail, and any tendency for binding of an associated interlock is precluded.

BRIEF DESCRIPTION OF THE DRAWINGS

The objects and advantages of this invention will become apparent to those skilled in the art upon careful consideration of the specification herein, including the drawings, wherein.

Figure 1:
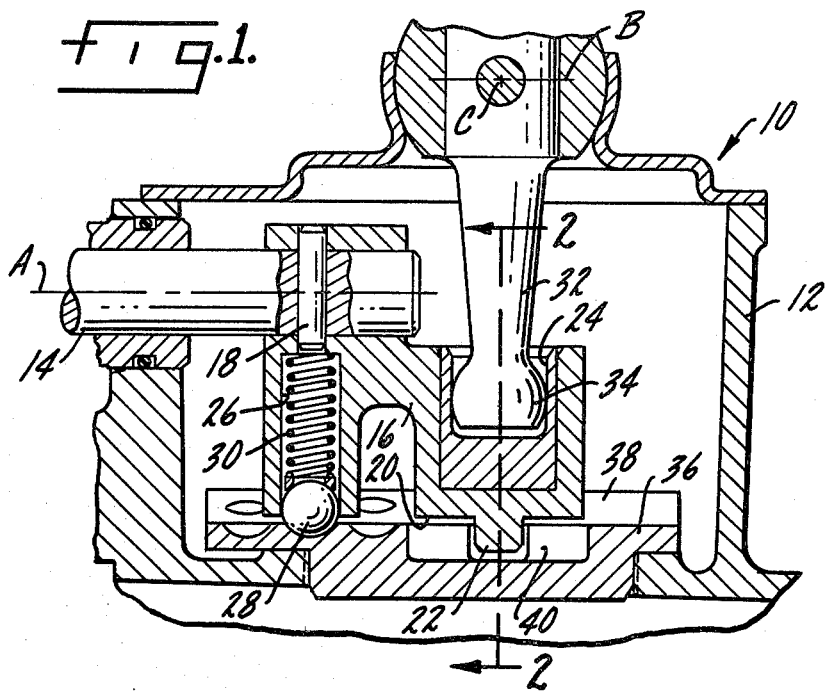
FIG. 1 is a sectional view showing the overall relationship of the components forming the shift stick, shift lever, shift rail and guide-detent apparatus.

While this invention is susceptible of embodiment in many different forms, there is shown in the drawings and herein will be described in detail a preferred embodiment. It should be understood that the present disclosure is considered to be an exemplification of the principles of the invention, and is not intended to limit the invention to this embodiment.

DESCRIPTION OF A PREFERRED EMBODIMENT

Referring now to the drawings in greater detail, there is shown generally a multiple speed, sliding gear manual transmission 10 adapted for use in an automotive vehicle or the like. Transmission 10 includes a transmission housing 12. As is conventional (and thus not shown) in such a transmission, there are input and output shafts as well as a plurality of gear sets which may be selectively engaged to establish a plurality of speed ratios for the transfer of torque between the input and output shafts.

By way of example, it may be assumed that transmission 10 provides five forward speed ratios and a reverse speed ratio. In this example, a single shift rail 14 is supported within housing 12 for lateral rotation on and longitudinal sliding movement along its axis A. Rotation of shift rail 14 to one position selects the first or second forward speed ratio, rotation to another position selects the third or fourth forward speed ratio, and rotation to still another position selects the fifth forward or reverse speed ratio. Longitudinal sliding movement of shift rail 14 engages the selected ratio. A transmission having selecting and engaging features of this type is disclosed in detail in U.S. Application 968,058 filed Dec. 11, 1978.

A crank arm in the form of an offset shift lever member 16 is secured to rail 14 by a suitable pin 18 or the like for rotational and longitudinal movement therewith. Lever 16 defines a surface 20, preferably of partial cylindrical configuration about axis A. A pin or other suitable element 22 projects outwardly from surface 20. Lever 16 also defines a socket 24 and a bore 26. A detent ball or other suitable element 28 projects from bore 26 and is loaded by a suitable detent spring 30.

A shift stick 32 defines a ball 34 received in socket 24 of lever 16. Stick 32 is supported by housing 12 in a conventional manner for rotation in a lateral plane on its axis B, and for rotation in a longitudinal plane on its axis C. Lateral rotation of stick 32 causes lateral, side-to-side arcuate movement of lever 16 about axis A. This in turn causes rotation of rail 14 on axis A. Similarly, longitudinal rotation of stick 32 causes longitudinal, fore-and-aft sliding movement of lever 16 and rail 14 along axis A. Suitable means, in the form of centering springs or the like, may be used to provide forces tending to bias stick 32 to a central neutral position.

Figure 3:
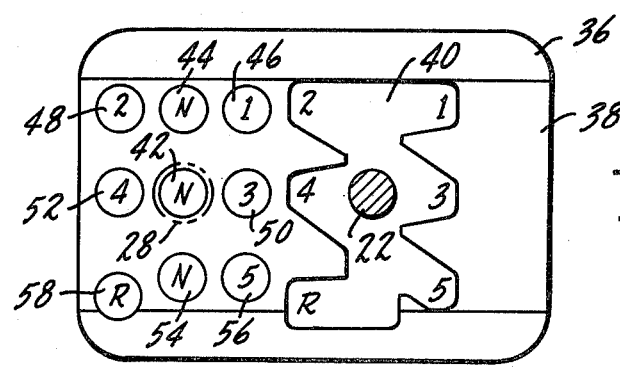
FIG. 3 is a plan view of the plate forming the guide track and detent map for the apparatus.

A guide plate member 36, which may be formed from powder metal, is press-fit or otherwise secured to housing 12. Plate 36 defines a surface 38 spaced slightly from surface 20 of lever 16. Surface 38 preferably is of partial cylindrical configuration about axis A. Plate 36 defines a groove or track 40 in surface 38. Pin 22 of lever 16 extends into track 40, and together they establish a network for guiding the movement of lever 16. As a result, this network precisely defines the movement of stick 32. As best shown in FIG. 3, a precise definition of the path to be followed by stick 32 for all gear changes may be predetermined by the relationship of pin 22 and track 40.

Plate 36 also defines a plurality of detent depressions 42 through 58 inclusive. The depressions form a detent map in surface 38. They are so oriented as to be engageable by ball 28 to develop detent forces tending to retain pin 22 in its position in track 40, and to offer some resistance to movement of pin 22 from one position to another. This resistance is felt by the operator as he manipulates stick 32.

Figure 2:
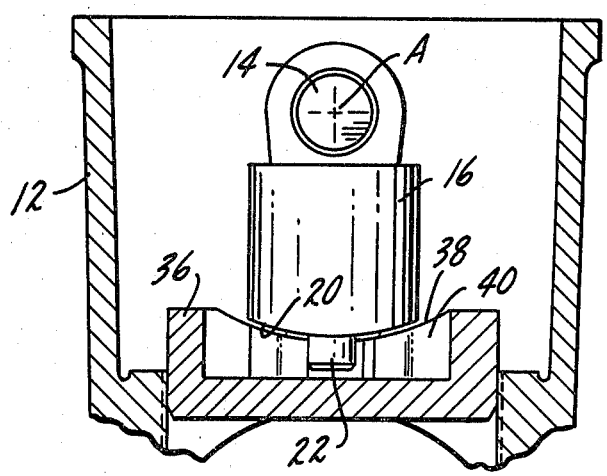
FIG. 2 is a sectional view taken along the line 2—2 of FIG. 1, with some structure omitted for clarity, showing additional details of the guide-detent apparatus.

An important advantage of this invention is the ability to individually predetermine the amount of operator feel for each movement of stick 32 in both the selecting and engaging directions. This may be accomplished by varying the depths of depressions 42-58. For example, assume that the guide-detent apparatus is in the position shown in FIGS. 1, 2 and 3. Ball 28 is in depression 42. If it is assumed further that the transmission is to be shifted from neutral into the first speed ratio, shift stick 32 would be manipulated so as to move pin 22 upwardly and rightwardly as shown in FIG. 3. This would move ball 28 out of depression 42, into and out of depression 44, and then into depression 46. The depth of each of these depressions determines the forces required to perform this shifting operation. Obviously, there would be less resistance to movement of ball 28 out of a shallow depression then there would be to movement out of a deep depression. Thus, the various forces providing operator feel may be predetermined individually for each of the selecting and engaging movements.

Figure 4:
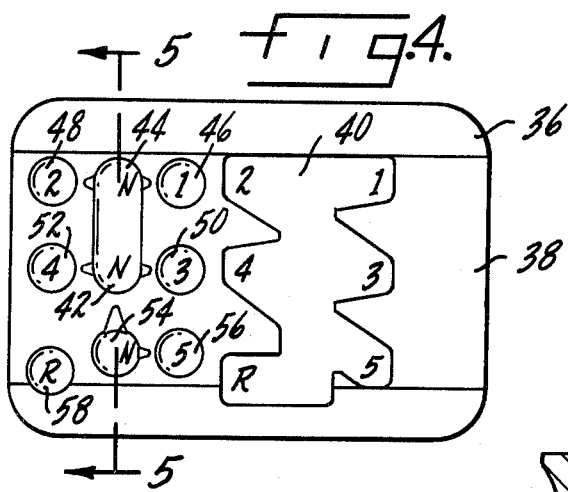
FIG. 4 is a plan view similar to FIG. 3 showing a modification of the detent map.
Figure 5:
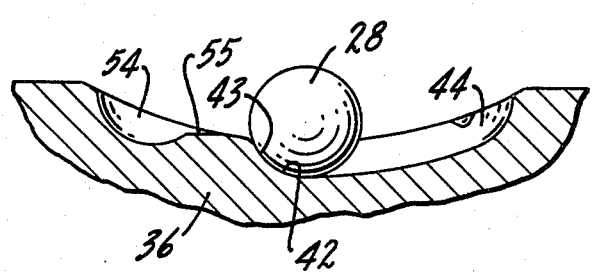
FIG. 5 is an enlarged sectional view taken along the line 5—5 of FIG. 4 showing additional details of the plate.

As shown in FIGS. 4 and 5, the various ramp angles of depressions 42-58 also may be varied to predetermine the force required for each individual movement in the selecting and engaging directions. For example, depressions 42 and 44 might together define a groove so that practically no resistance would be offered to movement of ball 28 out of depression 42 and into depression 44. Thus, movement of stick 32 from the central neutral position to the neutral position associated with the first and second speed ratios would be relatively easy. A steep ramp angle 43 might be formed for depression 42 so as to offer relatively heavy resistance to movement of ball 28 out of depression 42 and into depression 54.

Thus, movement of stick 32 from the central neutral position to the neutral position associated with the fifth forward and reverse speed ratios would be relatively difficult. The ramp angle 55 formed for depression 54 might be such as to offer relatively light resistance to movement of ball 28 out of depression 54 and into depression 42. Obviously, the various ramp angles for each depression may be individually formed so as to predetermine the detent force tending to resist individual selecting and engaging movements of lever 16 and stick 32.

Figure 6:
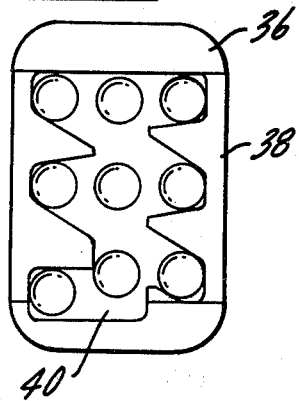
FIG. 6 is a reduced plan view similar to FIGS. 3 and 4 showing a modified form of the plate.

As shown in FIG. 6, the detent depressions may be formed within track 40. In this event, ball 28 would replace pin 22.

Figure 7:
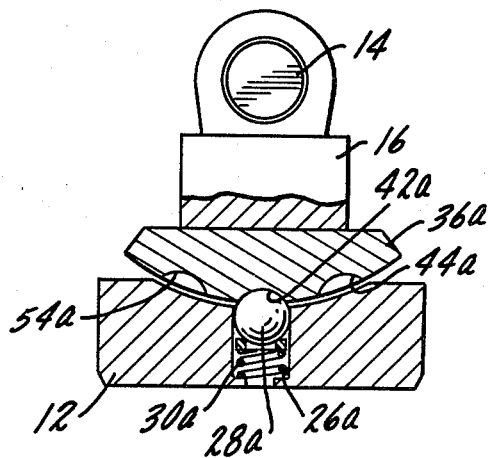
FIG. 7 is a partial sectional view showing a modified form of the guide-detent apparatus.

FIG. 7 shows that the detent mechanism may be reversed. Housing 12 may define a bore 26a within which are placed a detent ball 28a and a detent spring 30a. In this event, a plate 36a would define a plurality of depressions 42a, 44a, 54a, etc. as required for engagement by ball 28a. If desired, pin 22 and track 40 also could be reversed.

The detent mechanism shown herein includes a single spring-loaded detent ball and a plurality of detent depressions forming a map. If desired, this may be reversed by providing a plurality of spring-loaded detent balls associated with one or a small number of detent depressions. In this event the strength of the springs associated with the detent balls also could be varied to predetermine the detent forces.

In addition to the variables noted above, forces developed by the shift stick centering springs, if any, and forces developed during gear-engaging movement of the synchronizers should be considered when calculating the desired detent forces.

Figure 8:
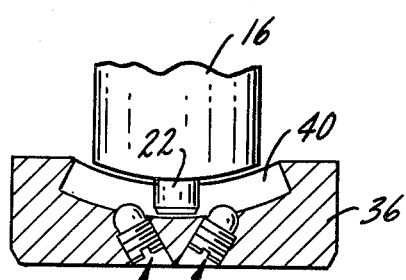
FIG. 8 is a partial sectional view showing another modified form of the guide-detent apparatus.

An alternative structure is shown in FIG. 8, where a plurality of detent devices 60, 62, etc. project into track 40 of plate 36. The detent devices are oriented so as to be contacted by pin 22 upon movement of lever 16. The orientation of the detent devices determines the forces tending to resist movement of pin 22. For example, it would require less force to rotate pin 22 clockwise from the central neutral position against the force of detent device 60 than it would require to rotate pin 22 counterclockwise back to the central neutral position against the force of device 60.

Thus, it should be obvious that simple and inexpensive means are provided herein for guiding and detenting transmission shift control apparatus. A movable member and a fixed member establish a pin-and-groove network that precisely defines shift stick movement. Stresses resulting from manipulation of the shift stick are absorbed by this network, thereby relieving the stresses which otherwise would be imposed upon the shift rail and its associated shift fork selector and interlock. In addition, a spring-loaded detent ball is associated with a map established by a plurality of detent depressions. The depth and/or ramp angles associated with each depression may be varied to individually predetermine the detent force tending to resist each movement of the shift stick in both the lateral and longitudinal planes.

Obviously the shift control guide and detent apparatus may be used with other transmissions than the single rail, five speed forward and reverse sliding gear manual transmission described herein by way of example.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. In apparatus for selectively engaging a plurality of gear sets in a manual transmission, said apparatus including a shift rail rotatable on and slidable along an axis, a shift lever secured to said rail, and a shift stick coupled with said lever, said stick being movable to a plurality of positions in one plane for effecting rotation of said lever and rail and movable to a plurality of positions in another plane for effecting sliding of said lever and rail; the improvement comprising a fixed plate member having a surface of partial cylindrical configuration about said axis, said plate member defining a track and a plurality of partially spherical depressions spaced therefrom in said surface, a pin projecting from said lever into engagement with said track, and a spring-loaded ball projecting from said lever for individual engagement with said depressions upon movement of said stick, said pin and track being constructed and arranged to define the path of movement of said stick in said planes, said ball and depressions being constructed and arranged to develop individually predetermined detent forces tending to resist movement of said stick to selected ones of said positions.

2. The invention of claim 1, the depth of each depression being individually selected to thereby individually predetermine each of said detent forces.

3. The invention of claim 1, the ramp angles of each depression being individually selected to thereby individually predetermine each of said detent forces.

4. The invention of claim 1, the depth and ramp angles of each depression being individually selected to thereby individually predetermine each of said detent forces.

* * * * *